(12) United States Patent
Li et al.

(10) Patent No.: US 9,158,812 B2
(45) Date of Patent: Oct. 13, 2015

(54) ENHANCING PARALLELISM IN EVALUATION RANKING/CUMULATIVE WINDOW FUNCTIONS

(71) Applicant: Oracle International Corporation, Redwood Shores, CA (US)

(72) Inventors: Huagang Li, San Jose, CA (US); Srikanth Bellamkonda, Mountain View, CA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 184 days.

(21) Appl. No.: 13/754,740

(22) Filed: Jan. 30, 2013

(65) Prior Publication Data

US 2014/0214799 A1    Jul. 31, 2014

(51) Int. Cl.
*G06F 7/00* (2006.01)
*G06F 17/30* (2006.01)

(52) U.S. Cl.
CPC .............................. *G06F 17/30445* (2013.01)

(58) Field of Classification Search
CPC ................... G06F 17/30471; G06F 17/30486; G06F 17/30306; G06F 17/30339; G06F 7/24
USPC ......................................................... 707/718
See application file for complete search history.

(56) References Cited

U.S. PATENT DOCUMENTS

| | | | | |
|---|---|---|---|---|
| 5,499,368 A | * | 3/1996 | Tate et al. ............................... | 1/1 |
| 6,389,410 B1 | * | 5/2002 | Gupta ................................... | 1/1 |
| 6,622,138 B1 | * | 9/2003 | Bellamkonda et al. ................ | 1/1 |
| 6,978,458 B1 | * | 12/2005 | Ghosh et al. ................... | 718/100 |
| 2005/0187958 A1 | * | 8/2005 | Wong ............................. | 707/101 |
| 2006/0190947 A1 | * | 8/2006 | Ghosh et al. ................... | 719/313 |
| 2009/0063527 A1 | * | 3/2009 | Corvinelli et al. ............. | 707/101 |

OTHER PUBLICATIONS

Bellamkonda et al., "Enhanced Subquery Optimizations in Oracle", VLDB, dated Aug. 24-28, 2009, Lyon France, pp. 1366-1377.
Bellamkonda et al., "Adaptive and Big Data Scale Parallel Execution in Oracle", The 39th International Conference on Very Large Data Bases, Dated Aug. 26, 2013, pp. 1102-1113.

* cited by examiner

*Primary Examiner* — Cheyne D Ly
(74) *Attorney, Agent, or Firm* — Hickman Palermo Becker Bingham LLP

(57) ABSTRACT

According to one aspect of the invention, for a database statement that specifies evaluating ranking or cumulative window functions, an execution strategy based on an extended data distribution key may be used for the database statement. In the execution strategy, each sort operator of multiple parallel processing sort operators computes locally evaluated results of a ranking or cumulative window function based on a subset of rows in all rows used to evaluate the database statement, and sends the first and last rows' locally evaluated results to a query coordinator. The query coordinator consolidates the locally evaluated results received from the multiple parallel processing sort operators and sends consolidated results to the sort operators based on their respective demographics. Each sort operator completes full evaluation of the ranking or cumulative window functions based at least in part on one or more of the consolidated results provided by the query coordinator.

20 Claims, 5 Drawing Sheets

ENHANCING PARALLELISM IN EVALUATION RANKING/CUMULATIVE WINDOW FUNCTIONS

TECHNICAL FIELD

The present invention relates to relational database management systems and, more specifically, to techniques for evaluating ranking and cumulative window functions in a relational database management system.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Window functions have been very popular in the user community and become an integral part of data warehouse queries. Some classes of window functions commonly used in data warehousing are ranking window functions and cumulative window functions. Database statements in data warehouse environments may involve one or more such window functions.

Window functions such as ranking window functions and cumulative window functions are often used as foundational analysis tools for data sets. For example, one or more such window functions may be used to extract information on sales data stored in a database system. This information can be utilized by a company to track sales, evaluate policy, develop marketing strategy, project future growth, and perform various other tasks.

In a database context, ranking window functions and cumulative window functions can be evaluated for a given set of records, which can be further grouped according to one or more partition-by key values and one or more order-by keys. The desired grouping can be specified in a database query, such as a SQL query.

Given the importance of window functions for data analysis, providing a quick result for database queries containing window functions is often an important database performance metric. To answer such a database query in an accelerated fashion, the database query can be formulated as parallel operations when creating a query execution plan for execution by database software in a hardware configuration.

Based on the foregoing, there is a need for developing techniques that can evaluate window functions in a highly efficient and scalable fashion.
The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1A:
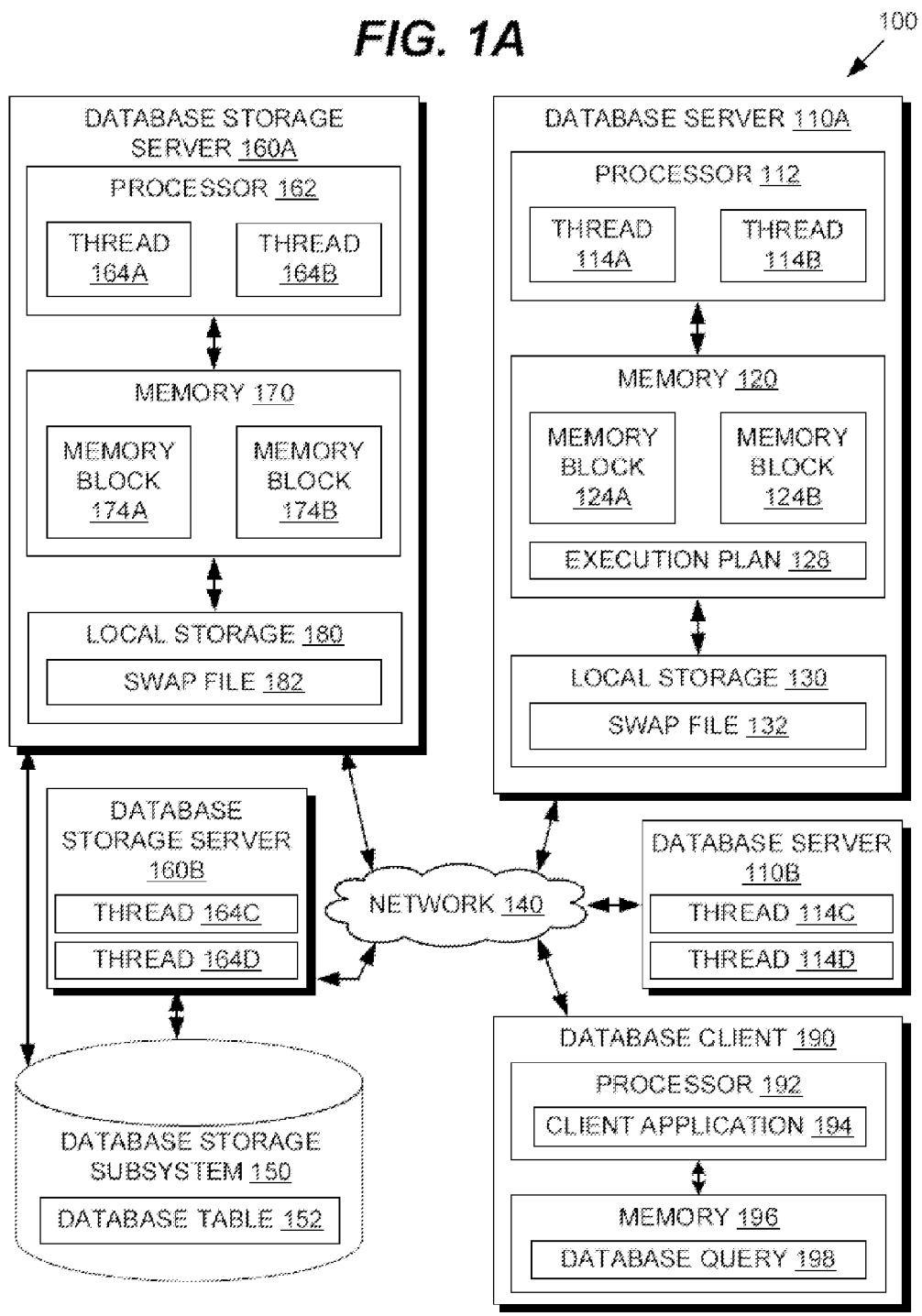
FIG. 1A is a block diagram that depicts an exemplary database system.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Definitions

A "computing node", as the term is used herein, refers to a set of one or more processes (under control of an operating system) and a portion of memory and/or other computer resources, that are allocated for performance of one or more functionalities pursuant execution of software by said one or more processes. A computing node is also referred to herein as a node. A node includes a "server" or "server instance" that is configured to respond to requests from various clients and applications for one or more services and/or functionalities.

Examples of nodes include without limitation database servers that manage data in one or more databases, storage devices that store data persistently for database servers, multimedia server instances that manage various types of multimedia such as images, audio/video streams, and other streamed multimedia content, internet server instances that cache content that is persistently stored elsewhere, application server instances and other types of middleware server instances that cache data to service particular types of clients and applications, and any other types of instances that are configured to process persistently stored data by buffering it into a volatile memory cache.

An "execution plan" or "query execution plan", as the term is used herein, refers to a set of steps that are generated by a database system to execute a database statement such as a query, etc. Several candidate execution plans may be generated for a particular statement, and a candidate execution plan estimated to be most efficient may be selected as the actual execution plan. The selection of an optimal candidate execution plan is beyond the scope of the present application and the selection of an efficient candidate execution plan will be assumed.

An execution plan may be represented by a tree (or a graph) of interlinked nodes, referred to herein as "operators", each of which corresponds to a step of an execution plan, referred to herein as an execution plan operation. The hierarchy of the tree represents the order in which the execution plan operations are performed and how data flows between each of the execution plan operations. Execution plan operations include, for example, an aggregation, a sort, a table scan, an index scan, hash-join, sort-merge join, nested-loop join, and filter.

A "record source", as the term is used herein, refers to an operator that when executed produces a set of rows, for example by scanning the rows of a database table, or by performing an operation, such as a table join, on one or more inputs to create a new set of intermediate records. When a record source is defined for a particular operator, such as for an aggregation operator, a consumer process, etc., then the record source is defined as an input for that particular operator.

When data is stored in a relational database system, applications access the data by submitting commands that conform to the database language supported by the relational database system. The most common database language is the Structured Query Language (SQL).

Relational database systems store data in the form of related tables, where each table has one or more columns and zero or more rows. A relational database management system may organize data in the tables in disk blocks (or data blocks) on disk. A "disk block" is a logical unit of data storage used by a relational database management system for storing database data. A disk block has a block size (e.g., 4 KB) and may encompass one or more underlying file system or operating system blocks. Among other information, a disk block may include the data of one or more rows of a table or tables, or the data of a row may span multiple disk blocks.

General Overview

A ranking or cumulative window function in a database statement refers to an analytical function (e.g., as specified in a "PARTITION BY" clause with an "ORDER BY" clause) that is evaluated against a sliding window of data from unbounded preceding up to a current row and returns a row number, rank, dense rank, sum, average, minimum, maximum, count, variance, standard deviation, first value, last value, etc., for each row in the sliding window up to that row (including its duplicates) in a result set. The database statement specifies one or more partition-by columns (or partition-by keys) in the "PARTITION-BY" clause and one or more order-by columns (or order-by keys) in the "ORDER BY" clause.

Parallel execution schemes for evaluating ranking window functions and cumulative window functions may not scale well. Typically, these schemes use a data distribution key comprising only partition-by keys to distribute input data to multiple processes executing in parallel. A data distribution key has a number of distinct values that may be used to distribute input data to different processes among parallel executing processes. The number of distinct data distribution key values determines the number of possible parallel executing processes that can be used to evaluate a ranking or cumulative window function.

When the partition-by keys have a low number of combinations of values, the number of possible parallel executing processes is also low.

For example, a database system may have hundreds, thousands, or more potential parallel executing processes available for parallel execution. A database statement may specify a "region" column in a table "sales" as the only partition-by key for a ranking or cumulative function. A data distribution key that comprises the partition-by key (the "region" column) would have only two distinct values (e.g., "west" and "east"). As a result, only two parallel executing processes could be used to receive input data to evaluate the ranking or cumulative window function.

To overcome scalability issues associated with a low number of distinct values of partition-by keys, a scalable computation algorithm as described herein selects a data distribution key (referred to as "extended data-distribution key") not just based on partition-by keys but also based on order-by keys. Additionally or optionally, other columns or temporary distribution variables may be used as part of the data distribution key or used in a distribution function based on the data distribution key. Because of the presence of the order-by keys, other columns, and temporary distribution variables, the number of distinct values of the data distribution key in the scalable computation algorithm can be made sufficiently large to distribute input data to a large number of parallel executing processes. This data distribution strategy is effective as it can scale up to many parallel executing processes (e.g., according to what is indicated by a parallel processing related parameter such as a degree of parallelism) without being limited to only the number of distinct combinations of values of the partition-by keys, resulting in a more efficient use of a large number of resources available in database systems than otherwise.

Two phases may be used in these scalable algorithms. In the first phase of the algorithms, input rows for evaluating a ranking or cumulative window function are distributed using an extended data-distribution key. The extended data-distribution key includes some or all keys from order-by keys in addition to partition-by keys. In some embodiments, the extended data-distribution key further includes a temporary distribution variable in addition to order-by keys and partition-by keys. Input data is distributed to a plurality of parallel executing processes such as operators based on a plurality of mutually exclusive ranges of the extended data-distribution key.

A parallel executing process that receives input data in a corresponding range in the plurality of mutually exclusive ranges can sort the input data based on the partition-by keys and the order-by keys. Each of the parallel executing processes may require information about input data distributed to or processed by other parallel executing processes in order to arrive at the final results for rows in the first data partition and/or the last data partition in the sorted input data received and processed by that parallel executing process. Each of the parallel executing processes first computes local (possibly partial) results based on the local input data in a corresponding range of the plurality of mutually exclusive ranges and communicates at least some (e.g., partially aggregated/evaluated values for the first row of the first data partition and the last row of the last data partition in the input data which the parallel executing process receives) of the partial results to a query coordinator for consolidation. In some embodiments, the partial results are sent with key information (e.g., values of the partition-by keys and/or the order-by keys) to the query coordinator.

In the second phase of the algorithms, the query coordinator performs consolidation on the received partial results from the parallel executing processes based on the demographics of data partitions from which the partial results are derived and/or based on the type of the ranking or cumulative window function being evaluated. The term "demographics" refers to a distribution of key values, for example, relative locations or ranges of a data partition in terms of key values of rows in the data partition in relation to other locations or ranges of other data partitions. The query coordinator sends, to the parallel executing processes, consolidated results and possibly other information (e.g., offsets or replacements to be used by respective parallel executing processes, etc.).

For data partitions spreading or distributed across multiple parallel executing processes, final results of the ranking or cumulative window function can be computed by the parallel executing processes based on the consolidated results and possibly other information as provided by the query coordinator. For data partitions not spreading or distributed across multiple parallel executing processes, final results of the window function may be independently computed without referring to the consolidated results as provided from the query coordinator.

System Overview

FIG. 1A is a block diagram that depicts an exemplary database system, according to an embodiment. Database system 100 of FIG. 1A includes database server 110A, database server 110B, network 140, database storage subsystem 150, database storage server 160A, database storage server 160B, and database client 190. Database server 110A includes processor 112, memory 120, and local storage 130. Processor 112 includes threads 114A and 114B. Memory 120 includes memory block 124A, memory block 124B, and execution plan 128. Local storage 130 includes swap file 132. Database server 110B includes thread 114C and thread 114D. Database storage subsystem 150 includes database table 152. Database storage server 160A includes processor 162, memory 170, and local storage 180. Processor 162 includes thread 164A and thread 164B. Memory 170 includes memory block 174A and memory block 174B. Local storage 180 includes swap file 182. Database storage server 160B includes thread 164C and thread 164D.

Database servers 110A-110B and database storage servers 160A-160B are multi-node systems, each comprising any multiple number of nodes. Threads 114A-114B may be referred to as consumers, whereas threads 164A-164B may be referred to as producers. Each thread may be configured as a node assigned to execute a particular operator of a query execution plan. Multiple nodes may be assigned to the same operator, which may also execute in parallel on multiple computing devices. Embodiments of the present invention are illustrated using multi-node systems, however an embodiment of the present invention is not so limited.

While only a single database client 190 is shown, embodiments of database system 100 may support multiple database clients concurrently. Additionally, while only a single database table 152 is shown in database storage subsystem 150, embodiments may also include multiple database tables, and database query 198 may address multiple database tables in a single query. Embodiments of database system 100 may also include any desired quantity of database servers, database storage servers, and database storage subsystems. For simplicity, database server 110B and database storage server 160B are shown in abbreviated form in FIG. 1A. However, database server 110B may contain elements similar to those shown in database server 110A, and database storage server 160B may contain elements similar to those shown in database storage server 160A.

Client application 194 executing on processor 192 of database client 190 may be directed towards various database applications including web services, data transactions, data mining, high-performance computing (HPC), and other applications. A database query 198 may be generated at client application 194 as a SQL query for execution on database table 152, and the query may be routed to an available database server, such as database server 110A. In response, database server 110A may generate a corresponding execution plan 128, which may be executed in parallel over available threads on database storage servers 160A-160B and database servers 110A-110B. As shown in database system 110, each thread 114A, 114B, 164A, and 164B may allocate a corresponding memory block 124A, 124B, 174A, and 174B, respectively. If insufficient memory is available, then virtual memory may be utilized via swap files 132 and 182 of local storage 130 and 180, respectively. However, as discussed below, execution plan 128 may be structured to avoid swapping to local storage.

Ranking and Cumulative Window Functions

A ranking or cumulative window function may be defined in the form of:

FUNCTION_NAME([expr1] . . . ) OVER (PARTITION BY expr2 [, expr3, . . . ]ORDER BY expr4 [, expr5, . . . ] [RANGE|ROWS BETWEEN UNBOUNDED PRECEDING AND CURRENT ROW])

As can be seen above, a ranking or cumulative reporting function is specified with one or more partition-by keys such as "expr2", "expr3", etc., in a partition-by clause and one or more order-by keys such as "expr4", "expr5", etc., in an order-by clause as shown above. The one or more partition-by keys as represented by the one or more expressions such as "expr2", "expr3", etc. The one or more order-by keys as represented by the one or more expressions such as "expr4", "expr5", etc., are ordered from left to right as specified in the order-by clause. The difference between keywords ROWS and RANGE is how rows with duplicate partition-by and order-by keys/column values are treated. With the specification of the keyword ROWS, aggregation for a given row in a plurality of duplicate rows with the same partition-by and order-by key values is up to that given row without regards to whether there are other duplicate rows that follow the given row. However, with the specification of the keyword RANGE, aggregation for a given row in a plurality of duplicate rows with the same partition-by and order-by key values is up to the last duplicate row regardless of whether the given row is the last duplicate row or not. It should be noted that the techniques for evaluating window functions (such as cumulative window functions in the discussion that follows) with the keyword RANGE can be easily extended to handle the same functions (e.g. the cumulative window functions) with the keyword ROWS.

Examples of ranking window functions include ROW_NUMBER( ), RANK( ), DENSE_RANK( ) etc. The following expressions are example database statements that include these types of ranking window functions:

SELECT region,sales_amount,ROW_NUM-
   BER( )OVER(PARTITION BY region ORDER
   BY sales_amount)FROM sales;    (1)

SELECT region,sales_amount,RANK( )OVER(PAR-
   TITION BY region ORDER BY sales_amount)
   FROM sales;    (2)

SELECT region,sales_amount,DENSE_
   RANK( )OVER(PARTITION BY region
   ORDER BY sales_amount)FROM sales;    (3)

Examples of cumulative window functions include SUM( ), MIN( ), MAX( ), COUNT( ), AVG( ), STDDEV( ), VARIANCE( ), FIRST_VALUE( ), LAST_VALUE( ), FIRST_VALUE (IGNORE NULLS), LAST_VALUE (IGNORE NULLS), etc. The following expressions are example database statements that include these types of cumulative window functions:

SELECT region,sales_amount,SUM(sales_amount)
   OVER(PARTITION BY region ORDER BY
   sales_amount)FROM sales;    (4)

SELECT region,sales_amount,MIN(sales_amount)
   OVER(PARTITION BY region ORDER BY
   sales_amount)FROM sales;    (5)

```
SELECT region,sales_amount,MAX(sales_amount)
    OVER(PARTITION BY region ORDER BY
    sales_amount)FROM sales;                                    (6)

SELECT region,sales_amount,COUNT(sales_a-
    mount)OVER(PARTITION BY region ORDER
    BY sales_amount)FROM sales;                                 (7)

SELECT region,sales_amount,AVG(sales_amount)
    OVER(PARTITION BY region ORDER BY
    sales_amount)FROM sales;                                    (8)

SELECT region,sales_amount,STDDEV(sales_a-
    mount)OVER(PARTITION BY region ORDER
    BY sales_amount)FROM sales;                                 (9)

SELECT region,sales_amount,VARIANCE(sales_a-
    mount)OVER(PARTITION BY region ORDER
    BY sales_amount)FROM sales;                                (10)

SELECT region,sales_amount,FIRST_VAL-
    UE(sales_amount)OVER(PARTITION BY
    region ORDER BY sales_amount)FROM sales;                   (11)

SELECT region,sales_amount,LAST_VAL-
    UE(sales_amount)OVER(PARTITION BY
    region ORDER BY sales_amount)FROM sales;                   (12)

SELECT region,sales_amount,FIRST_VAL-
    UE(sales_amount IGNORE NULLS)OVER
    (PARTITION BY region ORDER BY sales_a-
    mount)FROM sales;                                          (13)

SELECT region,sales_amount,LAST_VAL-
    UE(sales_amount IGNORE NULLS)OVER
    (PARTITION BY region ORDER BY sales_a-
    mount)FROM sales;                                          (14)
```

A database statement (e.g., a SQL statement) may specify one or more of these different types of ranking and/or cumulative window functions.

Execution Strategy Based on Partition-by Keys Only

In the example database statements as shown in expressions (1)-(14), the partition-by key among the three reporting window functions is the "region" column of the table "sales".

Figure 2A:
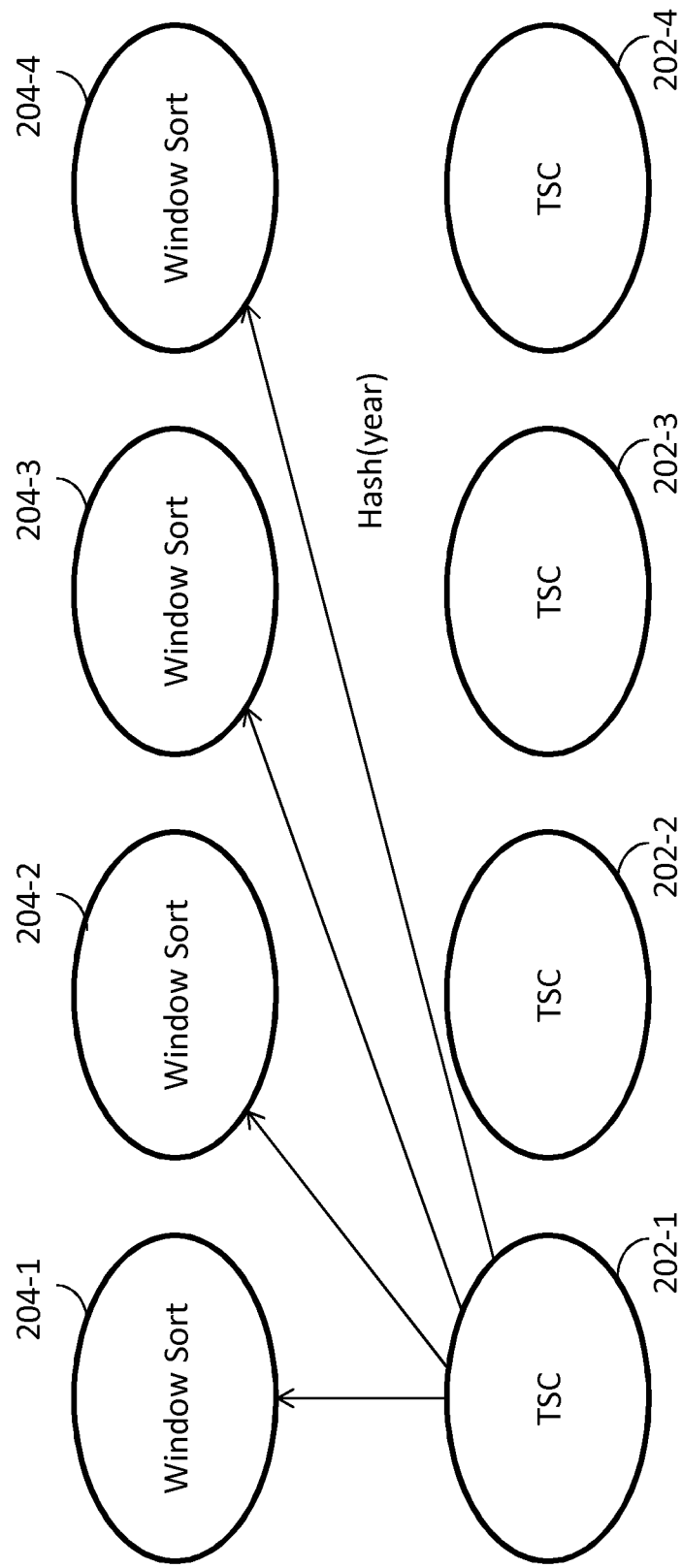
FIG. 2A and FIG. 2B illustrate example execution plans.

When a database statement such as any of expressions (1)-(14) is executed in parallel in runtime, data distribution to a plurality of operators/processes can be done based on distinct combinations of values of one or more partition-by keys specified in the database statement. A partition-by-key execution plan refers to a parallel execution plan for a database statement that uses such a data distribution approach. FIG. 2A illustrates an example partition-by-key execution plan to execute a database statement comprising reporting window functions as illustrated in expression (1). The partition-by-key execution plan comprises a plurality of table scan (TSC) operators and a plurality of window sort operators. Each of these operators in the partition-by-key execution plan may be assigned to a respective operator for execution in runtime.

Each window sort operator may consume or receive (input) rows with one or more specific distinct combinations of values of partition-by keys and assigned to evaluate the ranking or cumulative window function using the rows having these specific distinct combinations of values of the partition-by keys.

Each TSC operator may be assigned the task to retrieve (input) rows or records from a size-comparable portion of data blocks in a database table and distribute the retrieved rows to respective window sort operators based on distinct combinations of values of the partition-by keys as indicated in database values of the retrieved rows. A TSC operator may use a distribution function (hash-based or range-based or any other equivalent schemes) that takes a distinct combination of values of the partition-by keys indicated by database values of an input row as input and returns the identity of a corresponding window sort operator to which the input row should be sent or distributed.

Window sort operators/processes receiving their respective subsets of rows may sort or arrange the received rows into a sort order. Evaluation (e.g., sorting, ranking, aggregation, counting, etc.) of the ranking or cumulative window functions in the database statement may be performed against (e.g., sequentially through) the same sort order. Since all rows in a particular subset of rows received by a particular window sort operator/process share the same unique combination of values of the partition-by keys, the particular window sort operator/process can compute the ranking or cumulative window function based on the subset of rows, independent of other window sort operators/processes. The other window sort operators/processes can also concurrently and independently compute the same ranking or cumulative window function based on other subsets of rows that do not share the same combination of values of the partition-by keys as the particular subset of rows.

This parallel execution model works well when the number of partitions, or the number of subsets of rows created by distinct values of a partition-by keys, is sufficiently large to satisfy one or more criteria relating to a desired degree of parallelism (DOP).

Extended Data Distribution Key

A DOP refers to a type of parallel processing measure that indicates how many parallel processing entities/units such as parallel executing processes should be (approximately) used for parallel execution of a database statement. For example, a DOP value of ten may indicate that ten parallel executing processes may be available for performing one or more operations in parallel. A user may annotate different tables with the same or different DOP values. A query optimizer may also select a DOP value based on one or more factors including runtime conditions. For example, resource requirements such as CPU usage, I/O usage, etc., for a query may be estimated. In a non-limiting example, the resource requirements may be expressed as one or more numeric values. In some embodiments, a minimum time threshold may be defined for a processing entity such as a process; this parameter indicates that the processing entity should at least be occupied with work for a minimum time period as indicated by the minimum time threshold. A DOP value may be automatically determined based on the resource requirements estimated and the minimum time threshold. In an example, for a query that is estimated to take one minute, if a process requires a minimum time threshold of 10 seconds in order to perform useful work, a DOP value of six may be determined. In another example, for a query that is estimated to take ten minutes, if a process requires a minimum time threshold of 10 seconds in order to perform useful work, a DOP value sixty may be determined. It should be noted that other parallelism measures or parameters may be used in addition to or in place of a DOP. For example, the number of available processes may be directly used as a parallelism measure; in that case, the number of distinct values of a data distribution key should be larger than the number of processes available for executing reporting operations.

To overcome scalability issues associated with a low number of distinct values of partition-by keys in the prior approaches, two-phase scalable computation algorithms may be used to evaluate one or more ranking and/or cumulative window functions in a database statement.

In the first phase, an extended data distribution key is used to distribute input rows among a plurality of operators that evaluate a ranking or cumulative window function. In some embodiments, the extended data-distribution key further includes a temporary distribution variable in addition to order-by keys and partition-by keys. Input data is distributed to a plurality of parallel executing processes such as operators and parallel executing processes based on a plurality of mutually exclusive ranges of the extended data-distribution key. The evaluation of the ranking or cumulative window function may be partially performed by an operator in the plurality of operators, because the operator may not have all rows necessary for full evaluation of the ranking or cumulative window function. Partial results (e.g., locally evaluated results for the first and last partitions processed by an individual parallel executing processes in the plurality of parallel executing processes) in the evaluation of the ranking or cumulative window function are communicated to a query coordinator for consolidation. In some embodiments, the partial results are sent with key information (e.g., values of the partition-by keys and/or the order-by keys) to the query coordinator. The key information as provided by the parallel executing processes to the query coordinator may be used by the query coordinator to detect different rows with duplicate key values. This is important as unbounded preceding rows of a current data partition up to a current row are used to evaluate a ranking or cumulative window function up to the current row; where there are rows with duplicate (partition-by AND order-by) key values, the current row refers to the last row with the same duplicate key values no matter where the last row may be located.

In an example, the last row with the same duplicate key values may be in the same local data of a parallel executing process in which the very first row with the same duplicate key values appears. In another example, the last row with the same duplicate key values may be in local data of a parallel executing process (immediately or separated by one or more intermediate parallel executing processes) following a preceding parallel executing process in whose local data the very first row with the same duplicate key values appears.

In a second phase of the algorithms, the query coordinator performs consolidation on the partial results and sends consolidated results to respective parallel executing processes so that the parallel executing processes can produce final results. The query coordinator may be configured to use key values provided with the partial results to perform correct consolidation of the locally evaluated results.

As used herein, the term "data partition" refers to a logical partition of all input data (e.g., all input rows) that are used to evaluate a database statement such that input data (e.g., input rows) in the logical partition all share a distinct combination of the partition-by keys specified in a ranking or cumulative window function.

Producers of input data may also work in parallel with one another. A distribution function may be used by a producer to direct/distribute a given input row to a specific parallel executing process in a plurality of parallel executing processes that are tasked to evaluate a ranking or cumulative function based on their respective local input data. The distribution function divides all possible distinct combinations of values of partition-by keys and order-by keys in an extended data distribution key into a plurality of mutually exclusive ranges. Each range in the plurality of mutually exclusive ranges comprises one or more distinct (combinational key) values in the extended data distribution key. In embodiments in which the extended data distribution key includes a temporary distribution variable, a producer may assign values of the temporary distribution variables to input rows; input rows (e.g., duplicate rows) with the same distinct combination of the partition-by keys and order-by keys in the extended data distribution key can be distributed to one or more different but contiguous parallel executing processes in the plurality of parallel executing processes.

Since the extended data distribution key is more specific than the partition-by keys alone, input rows that have combinational key values in a range in the plurality of mutually exclusive ranges represent a data sub-partition, of a data partition represented by a distinct combination of values of the partition keys.

Enhance Parallelism

Figure 2B:
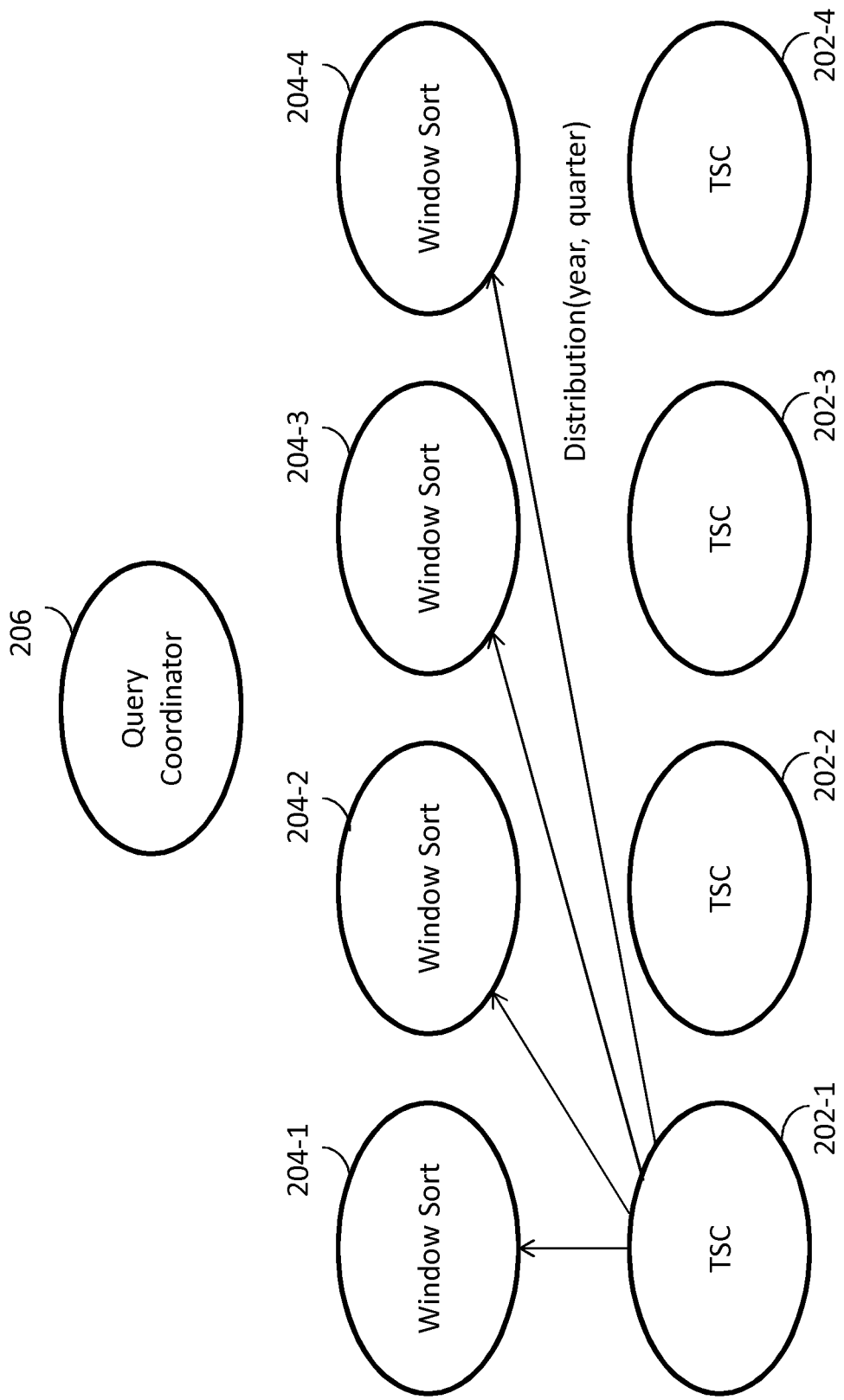

An extended-data-distribution-key execution plan refers to a parallel execution plan for a database statement that uses an extended data distribution key comprising (1) one or more (e.g., all) partition-by keys as specified by a ranking or cumulative window function, (2) one or more order-by keys as specified by the ranking or cumulative window function, and (3) a temporary distribution variable if used to further divide/distribute rows with duplicate rows (e.g., of same or duplicate partition-by and order-by key values), for data distribution to multiple parallel executing processes performing underlying database operations. FIG. 2B illustrates an example extended-data-distribution-key execution plan to execute a database statement comprising one or more ranking or cumulative window functions as illustrated in expressions (1)-(14). The extended-data-distribution-key execution plan comprises a plurality of table scan (TSC) operators (which may be parallel executing processes that produce input rows) and a plurality of window sort operators (which may be parallel executing processes performing evaluation of a ranking or cumulative window function based on their respective local input data received from the TSC operators). Each of these operators in the extended-data-distribution-key execution plan may be assigned to a respective parallel executing process for execution in runtime.

Each window sort operator may consume or receive (input) rows within a corresponding range in the plurality of mutually exclusive ranges (as further divided or distributed with a temporary distribution variable if used) and assigned to evaluate the ranking or cumulative window function using the rows in the corresponding range.

Each TSC operator may be assigned the task to retrieve (input) rows or records from a size-comparable portion of data blocks in a database table and distribute the retrieved rows to respective window sort operators based on distinct combinations of values of the partition-by keys and the order-by keys in the extended data distribution key as indicated in database values of the retrieved rows. A TSC operator may use a distribution function that takes a distinct combination of values of the partition-by keys and the order-by keys in the extended data distribution key indicated by database values of an input row as input and returns the identity of a corresponding range in the plurality of mutually exclusive ranges and/or a corresponding window sort operator to which the input row should be sent or distributed.

In embodiments in which an extended data distribution key further comprises a temporary distribution variable to distinguish rows with the same combination of values of partition-by keys and order-by keys, a cycle sequence value (which cycles through a sequence of values), a sequentially incrementing or decrementing value, a random number, etc., may be temporarily assigned (e.g., by a producer operator such as a TSC operator) as the value of the temporary distribution variable to a row. A producer may assign temporary values to the temporary distribution variable independently without regards to what temporary values another producer may assign to the temporary distribution variable. This introduces no conflict since there is no requirement that temporary values of the temporary distribution variable must be globally unique across all producers. A TSC operator, or through a table queue object, may use a distribution function that takes a distinct combination of values of the partition-by keys, the order-by keys and the temporary distribution variable in the extended data distribution key and returns the identity of a corresponding range in the plurality of mutually exclusive ranges and/or a corresponding window sort operator to which the input row should be sent or distributed.

Window sort operators/processes receiving their respective subsets of rows may sort or arrange the received rows into a sort order. In some embodiments, the sort order is determined by the partition-by keys and order-by keys included in the extended data distribution key. Alternatively or optionally, the sort order may be another order more specific than an order based on distinct (combinational) values of all partition-by keys and order-by keys. For instance, the sort order may additionally or optionally include another column (e.g., a measure column of cumulative window function; in some non-limiting embodiments, measure columns only applies to FIRST_VALUE/LAST_VALUE functions) as the lowest key column; such other column may not be a partition-by key or order-by key.

Once the sort order is set in local input data, evaluation (e.g., sorting, ranking, aggregation, counting, etc.) of the ranking or cumulative window functions in the database statement may be performed by an individual window sort operator in the plurality of window sort operators based on the local input data by an individual window sort operator/process against (e.g., sequentially through) the same sort order.

Input rows in a data partition may fall into different data sub-partitions and spread across two or more different processes (e.g., window sort operators) performing window sort operations. Duplicate rows in the same data sub-partition may be further distributed across multiple window sort operators when a temporary distribution variable is used in a distribution function.

For the purpose of illustration only, an extended data distribution key is formed by the "region" and "sales_amount" columns for parallel execution of the database statement as shown in expression (1), and may include a temporary distribution variable in some embodiments, in accordance with an extended-data-distribution-key execution plan as illustrated in FIG. 2B.

The number of operators in the extended-data-distribution-key execution plan may be selected or determined based at least in part on the number of the NDV of the extended data distribution key and/or a desired DOP value at either runtime or before the runtime. For the purpose of illustration only, four window sort operators 204-1 through 204-4 may be allocated. All possible distinct combinations of values of columns "region" and "sales_amount" are divided into a plurality of mutually exclusive ranges. For a given input row, a TSC operator (e.g., 202-1), or a table queue object therein, may determine a destination window sort operator to which the input row should be sent based on a distribution function that takes the "region" and "sales_amount" column values (and possibly values of a temporary distribution variable to further distinguish/distribute duplicate rows among multiple consumers or window sort operators) from the input row.

Since data distribution made to a plurality of window sort operators/processes is based on the "region" and "sales_amount" column (and possibly a temporary assigned value of a temporary distribution variable if used), a window sort operator/process (one of 204-1 through 204-1 in FIG. 2B) may receive and aggregate only a subset (e.g., only a few but not all data sub-partitions) of a data partition that are not sufficient for fully evaluating the ranking or cumulative window function. Under a parallel execution strategy that employs an extended data distribution key for data distribution, an operator working on its respective input rows may require information about other input rows processed by other operators (e.g., the respective input rows and the other input rows may overlap in a data partition), in order to fully evaluate the ranking or cumulative window function.

Under techniques as described herein, locally evaluated results (which may be partial) of the ranking or cumulative window function stored with the first and last rows of input rows (e.g., after sorting) in a window sort operator in the plurality of window sort operators are sent to a query coordinator 206 of FIG. 2B. Additional information such as partition-by key values and/or order-by key values of the first and last rows may be sent to the query coordinator 206 with the locally evaluated results of the ranking or cumulative window function.

A second consolidation phase is used in which the query coordinator 206 computes information necessary for window operators to consolidate the ranking or cumulative window function in data partitions to which locally evaluated results of the first rows and/or last rows from all the window sort operators 204-1 through 204-4 belong. The query coordinator 206 returns, to the window sort operators, the consolidated results of the ranking or cumulative window function based in part on specific demographics of the window sort operators. The query coordinator 206 may return, to the window sort operators, information such as specific offsets and/or specific replacements as a part of the consolidated results.

ROW_NUMBER( )

For the purpose of illustration, based on a determination relating to DOP, three of window sort operators 204-1 through 204-4 illustrated in FIG. 2B, respectively denoted as S0, S1, and S2, are used to evaluate a ranking function ROW_NUMBER( ) in a database statement as shown in expression (1). In the present example, an extended data distribution key may comprise a partition-by key "region" and an order-by key "sales_amount" but comprises no temporary distribution variable. All possible distinct combinational values of the partition-by key "region" and the order-by key "sales_amount" are divided into three mutually exclusive ranges. Each of the three mutually exclusive ranges is assigned to a different consumer S0, S1, or S2.

For example, S0 receives input rows from one or more producers (e.g., TSC operators of FIG. 2B) in the first range in the three ranges as shown in the following table:

TABLE 1

| Region | sales_amount |
|--------|--------------|
| r1     | 10           |
| r1     | 20           |
| r1     | 30           |
| r2     | 10           |
| r2     | 10           |

S1 and S2 receive input rows from the one or more producers for the second range and the third range in the three mutually exclusive ranges as shown in the following tables, respectively:

TABLE 2

| Region | sales_amount |
|---|---|
| r2 | 20 |
| r2 | 30 |
| r2 | 30 |

TABLE 3

| Region | sales_amount |
|---|---|
| r2 | 40 |
| r3 | 5 |
| r3 | 20 |
| r3 | 30 |

The consumers (S0, S1 and S2) perform evaluation of the ranking window function "ROW_NUMBER( )" based on their respective input data and sends locally evaluated results (some of which may be partial) of the first and last rows in their respective input data to a query coordinator (e.g., 206 of FIG. 2B), as shown in the following table:

TABLE 4

| Consumers | Information to QC | |
|---|---|---|
| S0 | The first row | (r1, 1) |
|  | The last row | (r2, 2) |
| S1 | The first row | (r2, 1) |
|  | The last row | (r2, 3) |
| S2 | The first row | (r2, 1) |
|  | The last row | (r3, 3) |

As can be seen above, for each (e.g., the last row of S0) of the first and last rows in its input data, a consumer (e.g., S0) sends a couplet (e.g., (r2, 2))—which may comprise locally evaluated result—that comprises a key value (e.g., "r2") of a data partition to which that row belongs and a row number function value (e.g., 2) in the data partition as seen in the input data (e.g., TABLE 1) received by the consumer (S0).

Based on the data (e.g., TABLE 4) received from the consumers, the query coordinator returns consolidated results to the consumers based at least in part on the consumers' demographics as shown in the following table:

TABLE 5

| Consumers | Information from QC |
|---|---|
| S0 | no "offset" |
| S1 | use 2 as "offset" for the first (also last) data partition (r2 data partition) |
| S2 | use 5 as "offset" for the first data partition (r2 data partition); no "offset" for other data partitions including the last data partition (r3 data partition) |

As can be seen above, the information sent by the query coordinator to a specific consumer of the three consumers depends on the demographics of the specific consumer in relation to other consumers in a global order in the plurality of mutually exclusive ranges.

The partition-by keys as ordered in the ranking or cumulative window function and the order-by keys as ordered in the same ranking or cumulative window function form a single composite key. The composite key can be used for distribution (either hash or range or any scheme which sends all rows with the same partition-by key value combination to a single process). Each process can receive data and sorts the data on composite key. A global order based on the composite key also may be used to set an order among the plurality of window sort operators. For example, all possible combinational key values may be divided, based on the composite key (or the global order which the composite key represents), into a plurality of mutually exclusive ranges as described herein. The first window sort operator in the plurality of window sort operators is given the first range(s) in the plurality of mutually exclusive ranges; the second window operator in the plurality of window sort operators is given possibly part of the last range of the first range(s) and/or the immediately ranges in the plurality of mutually exclusive ranges; and the last window sort operator in the plurality of window sort operators is given the last range(s) in the plurality of mutually exclusive ranges. The terms such as "demographics", "preceding", "immediately preceding," "following", "immediately following," etc., when used to describe window sort operators of FIG. 2B or data partitions, refer to this global order preserved by the distribution function. The plurality of producers each may implement the same distribution function for distributing their respective input rows to the plurality of window sort operators.

In the present example, S0 is assigned the first range in the mutually exclusive ranges. The query coordinator sends no offset to S0 as ROW_NUMBER( ) values produced by S0 based on its local input data are globally correct with all input data received by all the consumers S0, S1 and S2.

S1 is assigned the second range in the mutually exclusive ranges. Thus, the ROW_NUMBER( ) values produced by S1 based on its local input data may be partial result and thus may not be globally correct with all input data received by all the consumers S0, S1 and S2. Since the last row information from S0 indicates that S0 and S1 have different data sub-partitions in the same data partition (r2 data partition), the last ROW_NUMBER( ) in S0 (offset 2 as shown in TABLE 5) is sent to S1 as offset. As used herein, the term "offset" may refer to a quantity to be added to the local row number function value to obtain the final result.

S2 is assigned the third and last range in the mutually exclusive ranges. Thus, the ROW_NUMBER( ) values produced by S2 based on its local input data may also be partial result depending on what other input rows are processed by the preceding consumers and thus may not be globally correct with all input data received by all the consumers S0, S1 and S2. Since the last row information from S0 and S1 indicates that S0, S1 and S2 have different data sub-partitions in the same data partition (r2 data partition), the sum (offset 5 as shown in TABLE 5) of the last ROW_NUMBER( ) in S0 and the last ROW_NUMBER( ) in S1 is sent to S2 as offset. Other data partitions (e.g., r3 data partition) in S2 do not have data sub-partitions from preceding consumers; the query coordinator accordingly provides no offset to S2 for the other data partitions.

Based on the information from the query coordinator, each consumer can complete full evaluation of the ranking window function ROW_NUMBER( ) for each of the input rows for which that consumer is responsible.

For the ranking window function ROW_NUMBER( ) the same cooperative processing between the query coordinator and the consumers, as performed with an extended data distribution key that does not comprise a temporary distribution variable, may be similarly used with an extended data distribution key that comprises a temporary distribution variable. The value assignment for the ranking window function ROW_NUMBER( ) when duplicate rows are distributed among different consumers can be similarly performed to how the value assignment is performed when duplicate rows are not distributed among different consumers.

RANK( )

For the purpose of illustration, based on a determination relating to DOP, three consumers (e.g., three of window sort operators 204-1 through 204-4 illustrated in FIG. 2B), respectively denoted as S0, S1, and S2, are used to evaluate a ranking function RANK( ) in a database statement as shown in expression (2). In the first example of evaluating this ranking window function, an extended data distribution key may comprise a partition-by key "region" and an order-by key "sales_amount" but no temporary distribution variable. Input data as illustrated in TABLEs 1, 2 and 3 are respectively assigned to the consumers S0, S1 and S2 based on the same mutually exclusive ranges as illustrated with ROW_NUMBER( ).

The consumers (S0, S1 and S2) perform evaluation of the ranking window function "RANK( )" based on their respective input data and send the locally evaluated results (some of which may be partial) of the first and last rows in their respective input data to a query coordinator (e.g., 206 of FIG. 2B), as shown in TABLE 4. However, in a couplet (e.g., (r2, 2)), the second value (e.g., 2 as in the couplet (r2, 2)) now carries a rank function value in the present example.

Based on the data (e.g., TABLE 4) received from the consumers, the query coordinator returns consolidated results as shown TABLE 5. However, any offset in TABLE 5 now carries a quantity to be added to a local rank function value in the present example.

Based on the information from the query coordinator, each consumer can complete full evaluation of the ranking window function RANK( ) for each of the input rows for which that consumer is responsible.

For the ranking window function RANK( ) the same cooperative processing between the query coordinator and the consumers, as performed with an extended data distribution key that does not comprise a temporary distribution variable, may not be used with an extended data distribution key that comprises a temporary distribution variable.

When a temporary distribution variable is used in a distribution key, the value assignment for the ranking window function RANK( ) not only should be in compliance with the ordering of partition-by keys and order-by keys but also should take into account the fact that a later consumer's first row may have a rank function value tied (denoted herein as a "tied rank") with a rank function value of the preceding consumer's last row as duplicate rows may be distributed among different consumers. Thus, what rank function values the preceding consumer(s) have assigned to the last row(s) with the same partition-by key values and the same order-by key values as those of the later consumer's first row(s) should be assigned to the later consumer's first row(s).

In some embodiments, the query coordinator is configured to determine how many preceding consumers are involved in a particular tied rank, depending on how numerous rows with the same partition-by key values and the same order-by key values as those of the later consumer's first row and to determine an offset for ranks for consumers depending on the demographics of data partitions and/or data sub-partitions in the consumers.

For the purpose of illustration, S0 receives input rows from one or more producers (e.g., TSC operators of FIG. 2B) as shown in the following table:

TABLE 6

| Region | sales_amount |
|--------|--------------|
| r1     | 10           |
| r1     | 20           |
| r1     | 30           |
| r2     | 10           |

S1 and S2 receive input rows from the one or more producers as shown in the following tables, respectively:

TABLE 7

| Region | sales_amount |
|--------|--------------|
| r2     | 10           |
| r2     | 10           |
| r2     | 20           |
| r2     | 30           |

TABLE 8

| Region | sales_amount |
|--------|--------------|
| r2     | 30           |
| r2     | 40           |
| r3     | 5            |
| r3     | 20           |
| r3     | 30           |

As can be seen above, the input rows as received by the three consumers are in compliance with a global order as represented by a composite key comprising the partition-by key "region" and the order-by key "sales_amount". However, duplicate rows (with the same value of the composite key) may be distributed to different consumers. The consumers (S0, S1 and S2) compute locally evaluated results of the ranking window function "RANK( )" based on their respective input data and send the locally evaluated results (some of which may be partial) of the first and last rows in their respective input data to a query coordinator (e.g., 206 of FIG. 2B), as shown in the following table:

TABLE 9

| Consumers | Information to QC | |
|-----------|-------------------|---|
| S0        | The first row     | (r1, 10, 1, 1) |
|           | The last row      | (r2, 10, 1, 1) |
| S1        | The first row     | (r2, 10, 1, 1) |
|           | The last row      | (r2, 30, 4, 4) |
| S2        | The first row     | (r2, 30, 1, 1) |
|           | The last row      | (r3, 30, 3, 3) |

As can be seen above, for each (e.g., the last row of S0) of the first and last rows, a consumer (e.g., S0) sends a multi-field object (e.g., (r2, 10, 1, 1))—which may comprise locally evaluated result—that comprises a partition-by key value (e.g., "r2") of that row, an order-by key value (e.g., "10") of that row, a local count (e.g., 1) of rows in a data partition (e.g., "r2" data partition) to which that row belongs, and a local rank function value (e.g., 1) in the data partition ("r2" data partition), as seen in the input data (e.g., TABLE 6) received by the consumer (S0).

Based on the data (e.g., TABLE 9) received from the consumers, the query coordinator returns consolidated results as shown in the following table:

TABLE 10

| Consumers | Information from QC |
|---|---|
| S0 | No "offset" |
| S1 | first row corresponding to a data partition ("r2") that has rows in preceding consumers (S0): for "tied" rows ["tied" rows: rows with same tied rank or same order-by key values within the same data partition], use the tied rank from the last row of S0, which is 1 for non-"tied"-rows, use the sum of local count(s) of rows in the same data partition ("r2") in one or more preceding consumers (S0 in the present example), which in this case is 1 from S0, as "offset" Other rows not corresponding to a data partition ("r2") of the preceding consumer (S0)'s last row can be processed without referring to information from preceding consumers (in the present example, no such rows in S1) |
| S2 | Same rules for returned information from query coordinator are used. Therefore, Since the first row's data partition ("r2" data partition) of S2 spreads or is distributed among S0, S1 and S2, the sum (1 from S0 plus 4 from S1) of counts of rows in the data partition ("r2" data partition) is provided as "offset" for the first row's data partition of S2 No "offset" for other data partitions of S2 including the last data partition ("r3" data partition) |

Based on the information from the query coordinator, each consumer can complete full evaluation of the ranking window function RANK( ) for each of the input rows for which that consumer is responsible.

DENSE_RANK( )

For the purpose of illustration, to evaluate a ranking function DENSE_RANK( ) in a database statement as shown in expression (3), S0, S1 and S2 receive input rows from one or more producers (e.g., TSC operators of FIG. 2B) in the three ranges, respectively, as shown in TABLES 1, 2 and 3.

The consumers (S0, S1 and S2) compute locally evaluated results of the ranking window function "DENSE_RANK( )" based on their respective input data and send the locally evaluated results (some of which may be partial) of the first and last rows in their respective input data to a query coordinator (e.g., 206 of FIG. 2B), as shown in the following table (note that in some embodiments, an extended distribution key does not distribute rows with same partition-by key values and order-by key values to different processes):

TABLE 11

| Consumers | Information to QC | |
|---|---|---|
| S0 | The first row | (r1, 1) |
|    | The last row  | (r2, 1) |
| S1 | The first row | (r2, 1) |
|    | The last row  | (r2, 2) |
| S2 | The first row | (r2, 1) |
|    | The last row  | (r3, 3) |

As can be seen above, for each (e.g., the last row of S0) of the first and last rows, a consumer (e.g., S0) sends a couplet (e.g., (r2, 1))—which may comprise partial evaluation result—that comprises a key value (e.g., "r2") of a data partition to which that row belongs and a local dense rank function value (e.g., 1) of that row, in the data partition as seen in the input data (e.g., TABLE 1) received by the consumer (S0).

Based on the data (e.g., TABLE 11) received from the consumers, the query coordinator returns consolidated results as shown in the following table:

TABLE 12

| consumers | Information from QC |
|---|---|
| S0 | no "offset" |
| S1 | use 1, which is the dense_rank obtained from s0, as "offset" for the first (also last) data partition ("r2" data partition) |
| S2 | use 3, which is the sum of the last dense rank function value 1 of S0 in the same data partition ("r2" data partition) and the last dense rank function value 2 of S1 in the same data partition ("r2" data partition), as "offset" for the first data partition (r2 data partition); no "offset" for other data partitions including the last data partition (r3 data partition) |

Based on the consolidated results from the query coordinator, each consumer can complete full evaluation of the ranking window function DENSE_RANK( ) for each of the input rows for which that consumer is responsible.

To evaluate the same dense rank function, an extended data distribution key may instead comprise a partition-by key "region", an order-by key "sales_amount" and a temporary distribution variable. With a distribution function that in part depends on the temporary distribution variable, S0 may receive input rows from one or more producers (e.g., TSC operators of FIG. 2B) as shown in the following table:

TABLE 13

| Region | sales_amount |
|---|---|
| r1 | 10 |
| r1 | 20 |
| r1 | 30 |
| r2 | 5 |
| r2 | 10 |

S1 and S2 receive input rows from the one or more producers as shown in TABLEs 7 and 8, respectively.

The consumers (S0, S1 and S2) computes locally evaluated results of the ranking window function "DENSE_RANK( )" based on their respective input data and send the locally evaluated results (some of which may be partial) of the first and last rows in their respective input data to a query coordinator (e.g., 206 of FIG. 2B), as shown in the following table:

TABLE 14

| Consumers | Information to QC | |
|---|---|---|
| S0 | The first row | (r1, 10, 1) |
|    | The last row  | (r2, 10, 2) |
| S1 | The first row | (r2, 10, 1) |
|    | The last row  | (r2, 30, 3) |
| S2 | The first row | (r2, 30, 1) |
|    | The last row  | (r3, 30, 3) |

As can be seen above, for each (e.g., the last row of S0) of the first and last rows, a consumer (e.g., S0) sends a multi-field object (e.g., (r2, 10, 2))—which may comprise partial evaluation result—that comprises a partition-by key value (e.g., "r2") of that row, an order-by key value (e.g., "10") of that row, and a local dense rank function value (e.g., 2) in the data partition ("r2" data partition), as seen in the input data (e.g., TABLE 13) received by the consumer (S0).

Based on the data (e.g., TABLE 14) received from the consumers, the query coordinator returns consolidated results as shown in the following table:

TABLE 15

| Consumers | Information from QC |
|---|---|
| S0 | no "offset" |
| S1 | first row corresponding to a data partition ("r2") that has rows in preceding consumers (S0): for "tied" rows ("tied" rows: rows with same tied dense rank or same order-by key values within the same data partition), use the tied dense rank from the last row of S0, which is 2 for non-"tied"-rows, use the sum of distinct dense rank function values in the same data partition in one or more preceding consumers, which in this case is 2 from S0, as "offset", if the current consumer (S1) does not have at least one tied row. If the current consumer S1 has a tied row, the offset should be further subtracted by 1 as the tied row(s) would have consumed a distinct dense rank function value in the current consumer. For example, the dense rank value for the row (r2, 20) in TABLE 7 should be its local dense rank value 2 plus offset 1 (obtained as the last dense rank function value 2 of S0 minus 1, which is due to the tied rows (r2, 10) in S1), equaling to 3. Other rows (none in the present example) not corresponding to the data partition ("r2") of the preceding consumer (S0)'s last row can be processed without referring to information from preceding consumers (in the present example, no such rows in S1) |
| S2 | Since the first row's data partition ("r2" data partition) of S2 spreads or is distributed among S0, S1 and S2, the sum (3) of the offset 1 (the last dense rank value 2 of S0 minus 1 due to tied rows) of S1 and the last dense rank value 3 of S1 minus 1 (because S2's first row is also a tied row) is provided as "offset" for rows without a tied dense rank in the first row's data partition of S2. For rows with "tied" dense rank, use 4, which is derived by the offset 1 of S1 + local dense rank of the last row from S1 (1 + 3) No "offset" for other data partitions of S2 including the last data partition ("r3" data partition) |

Based on the consolidated results from the query coordinator, each consumer can complete full evaluation of the ranking window function DENSE_RANK( ) for each of the input rows for which that consumer is responsible.

Cumulative Window Functions

For the purpose of illustration, an extended data distribution key that comprises a partition-by key "region" and an order-by key "sales_amount" but no temporary distribution variable is used for data distribution in evaluating a cumulative window function SUM( ) in a database statement as shown in expression (4). For example, S0, S1 and S2 receive input rows from one or more producers (e.g., TSC operators of FIG. 2B), respectively, as shown in TABLEs 1, 2 and 3.

The consumers (S0, S1 and S2) compute locally evaluated results of the cumulative window function SUM( ) based on their respective input data and send the locally evaluated results (some of which may be partial) of the first and last rows in their respective input data to a query coordinator (e.g., 206 of FIG. 2B), as shown in the following table:

TABLE 16

| Consumers | Information to QC | |
|---|---|---|
| S0 | The first row | (r1, 10) |
| | The last row | (r2, 20) |
| S1 | The first row | (r2, 20) |
| | The last row | (r2, 80) |
| S2 | The first row | (r2, 40) |
| | The last row | (r3, 55) |

As can be seen above, for each (e.g., the last row of S0) of the first and last rows, a consumer (e.g., S0) sends a couplet (e.g., (r2, 20))—which may comprise partial evaluation result—that comprises a key value (e.g., "r2") of a data partition to which that row belongs and a local sum function value (e.g., 20) in the data partition as seen in the input data (e.g., TABLE 1) received by the consumer (S0).

Based on the data (e.g., TABLE 16) received from the consumers, the query coordinator returns consolidated results as shown in the following table:

TABLE 17

| Consumers | Information from QC |
|---|---|
| S0 | no "offset" |
| S1 | use 20, which is the value of window function for the last row from s0, "offset" for the first (also last) data partition ("r2" data partition) |
| S2 | use 100, which is the sum of the sum function values (20 and 80 respectively from S0 and S1) of the preceding consumers for the same data partition (r2 data partition), as "offset" for the first data partition (r2 data partition); no "offset" for other data partitions including the last data partition (r3 data partition) |

Based on the information from the query coordinator, each consumer can complete full evaluation of the cumulative window function SUM( ) for each of the input rows for which that consumer is responsible.

The same SUM( ) may be evaluated with an extended data distribution key that comprises a partition-by key "region", an order-by key "sales_amount" and a temporary distribution variable. For example, S0, S1, and S3 receive input rows from one or more producers (e.g., TSC operators of FIG. 2B) as shown in TABLEs 6, 7, and 8.

The consumers (S0, S1 and S2) computes locally evaluated results of the cumulative window function "SUM( )" based on their respective input data and send the locally evaluated results (some of which may be partial) of the first and last rows in their respective input data to a query coordinator (e.g., 206 of FIG. 2B), as shown in the following table:

TABLE 18

| Consumers | Information to QC | |
|---|---|---|
| S0 | The first row | (r1, 10, 10) |
| | The last row | (r2, 10, 10) |
| S1 | The first row | (r2, 10, 20) |
| | The last row | (r2, 30, 70) |
| S2 | The first row | (r2, 30, 30) |
| | The last row | (r3, 30, 55) |

As can be seen above, for each (e.g., the last row of S0) of the first and last rows, a consumer (e.g., S0) sends a multi-field object (e.g., (r2, 10, 10))—which may comprise partial evaluation result—that comprises a partition-by key value (e.g., "r2") of that row, an order-by key value (e.g., "10") of that row, and a local cumulative function value (e.g., 10) in the data partition ("r2" data partition), as seen in the input data (e.g., TABLE 6) received by the consumer (S0).

Based on the data (e.g., TABLE 18) received from the consumers, the query coordinator returns consolidated results as shown in the following table:

TABLE 19

| Consumers | Information from QC |
|---|---|
| S0 | No "offset" for any data partition (e.g., "r1" data partition) before the last data partition ("r2" data partition); the last row from the last data partition ("r2" data partition) has tied rows from S1 and the cumulative function value (20) of the tied rows from S1 is provided to S0 to obtain the final result 30 (20 from S1 plus 10 from the last row of S0) in the last data partition (("r2" data partition) [Note that tied rows containing a current row are considered together as the current row] |
| S1 | Since a tied row of a cumulative function value 10 exists in the last data partition ("r2" data partition) of the preceding consumer S0, use the cumulative function value 10 of S1's last row as "offset" for rows in the first data partition of S1 and obtain a final result 30 (the offset 10 plus the local cumulative function value 20); For rows with "tied" rows from S2, use an offset 110 to produce the final results, wherein the offset 110 is derived from the offset 10 from S0 + 70 (local cumulative sum) + 30 (the cumulative function value of the tied row in S2); For rows without "tied" rows from either S0 or S2, use the offset 10 from S0 + local cumulative function value; e.g., for row (r2, 20) in TABLE 7, the final result is 10 + 40 (the local cumulative function value of 10 + 10 + 20 from the first three rows, respectively, in S1) = 50 |
| S2 | Since the data partition ("r2" data partition) spreads across S0, S1 and S2, use the offset 10 from S0 + the local cumulative function value 70 of S1 = 80 as "offset"; For rows in the first data partition ("r2" data partition) with "tied" rows from S1, produce the final result 110 (30 + 80); For rows in the data partition ("r2" data partition) without "tied" rows from S1, use the offset 80 from S1 + local cumulative function value; e.g., for row (r2, 40) in TABLE 8, the final result is 80 + 70 (which is the local cumulative function value 30 + 40 from the first two rows, respectively, of S2) = 150; For rows in other data partitions (e.g., the last data partition or "r3" data partition), no need to use any offset or special processing |

Based on the information from the query coordinator, each consumer can complete full evaluation of the cumulative window function SUM( ) for each of the input rows for which that consumer is responsible.

Cumulative window functions such as those illustrated in expressions (4)-(14), may be evaluated in a manner similar to how the ranking or cumulative window functions as discussed above are evaluated.

For the purpose of illustration only, it has been described that a temporary distribution variable other than partition-by keys and order-by keys may be used in an extended data distribution key. However, instead of using a temporary distribution variable that is not a column in input data, one or more columns in the input data other than partition-by keys and order-by keys may be used in an extended data distribution key.

Also, for the purpose of illustration only, it has been described that techniques as described herein can be used to evaluate a ranking or cumulative function specified with a measure (e.g., a "sales_amount" column) that is also an order-by key. However, these techniques can also be adapted or used to evaluate a ranking or cumulative function specified with a measure that is not an order-by key. Examples of database statements that comprise a window function specified with a measure other than an order-by key may include, but are not limited only to: the following expressions:

SELECT A,C,measure,

FIRST_VALUE(measure)OVER(PARTITION BY A
   ORDER BY B)fv1,

LAST_VALUE(measure)OVER(PARTITION BY A
   ORDER BY B)lv1

FROM t_toy; (15)

SELECT A,C,measure,

FIRST_VALUE(measure IGNORE NULLS)OVER
   (PARTITION BY A ORDER BY B)fv1,

LAST_VALUE(measure IGNORE NULLS)OVER
   (PARTITION BY A ORDER BY B)lv1

FROM t_toy; (16)

For the purpose of illustration, based on a determination relating to DOP, three consumers (e.g., three of window sort operators 204-1 through 204-4 illustrated in FIG. 2B), respectively denoted as S0, S1, and S2, are used to evaluate a ranking or cumulative window function in a database statement as shown in expression (15). An extended data distribution key may comprise a partition-by key "A" and an order-by key "B" but no temporary distribution variable. All possible distinct combinational values of the partition-by key "A" and the order-by key "B" are divided into three mutually exclusive ranges. Each of the three mutually exclusive ranges is assigned to a different consumer S0, S1, or S2, respectively.

For example, S0 receives input rows from one or more producers (e.g., TSC operators of FIG. 2B) in the first range (demographics) in the three ranges as shown in the following table:

TABLE 20

| A | B | measure |
|---|---|---|
| 1 | 1 | 1 |
| 1 | 1 | 1 |
| 1 | 1 | 4 |
| 1 | 1 | 21 |
| 1 | 2 | 1 |
| 1 | 2 | 9 |

TABLE 20-continued

| A | B | measure |
|---|---|---------|
| 1 | 2 | 10 |
| 1 | 2 | 20 |

S1 and S2 receive input rows from one or more producers for the second range and the third range in the three mutually exclusive ranges as shown in the following tables, respectively:

TABLE 21

| A | B | Measure |
|---|---|---------|
| 2 | 1 | 7 |
| 2 | 1 | 10 |

TABLE 22

| A | B | Measure |
|---|---|---------|
| 2 | 2 | 1 |
| 2 | 2 | 5 |
| 2 | 2 | 10 |
| 2 | 3 | 1 |
| 2 | 3 | 1 |
| 2 | 3 | 7 |
| 2 | 3 | 9 |
| 2 | 3 | 11 |
| 2 | 3 | NULL |

As can be seen above, a global order may be defined by a composite key comprising an ordered set of the partition-by key "A", the order-by key "B", and the "measure" column. The consumers (S0, S1 and S2) compute locally evaluated results of the cumulative window functions "FIRST_VALUE( )" and "LAST_VALUE( )" based on their respective input data and send the locally evaluated results (some of which may be partial) of the first and last rows in their respective input data to a query coordinator (e.g., 206 of FIG. 2B), as shown in the following table:

TABLE 23

| Consumers | Information to QC | |
|-----------|-------------------|---|
| S0 | The first row | (1, 1, 21) |
|    | The last row  | (1, 1, 20) |
| S1 | The first row | (2, 7, 10) |
|    | The last row  | (2, 7, 10) |
| S2 | The first row | (2, 1, 10) |
|    | The last row  | (2, 1, null) |

As can be seen above, for each (e.g., the last row of S0) of the first and last rows, a consumer (e.g., S0) sends a multi-field object (e.g., (1, 1, 20))—which may comprise partial evaluation result—that comprises a key value (e.g., "1") of a data partition to which that row belongs, a FIRST_VALUE( ) function value 1 of a data partition (A="1" data partition) up to that row, and a LAST_VALUE( ) function value 20 of the data partition (A="1" partition) up to that row, as seen in the input data (e.g., TABLE 20) received by the consumer (S0).

Based on the data (e.g., TABLE 23) received from the consumers, the query coordinator returns consolidated results as shown in the following table:

TABLE 24

| Consumers | Information from QC |
|-----------|---------------------|
| S0 | no "offset" needed |
| S1 | no "offset" needed [as partitions are different] |
| S2 | use the first_value 7 from the very first row - in this example, S1's first row - from this or preceding consumers in the same data partition (A = "2" data partition) as "offset" for the first_value for rows from the first data partition (replace the local first_value with this "offset"); for the last_value, use the local last_value without special processing |

Based on the information from the query coordinator, each consumer can complete full evaluation of the cumulative window functions FIRST_VALUE( ) and LAST_VALUE( ) for each of the input rows for which that consumer is responsible.

To evaluate a ranking or cumulative window function in a database statement as shown in expression (15), an extended data distribution key that comprises a column (e.g., the "measure" column as specified in expression (15)) in addition to a partition-by key "A" and an order-by key "B" may be used for data distribution, without using a temporary distribution variable. For example, all possible distinct combinational values of the partition-by key "region", the order-by key "sales_amount", and the "measure" column, are divided into three mutually exclusive ranges. Each of the three mutually exclusive ranges is assigned to a different consumer S0, S1, or S2.

For the purpose of illustration, S0 receives input rows from one or more producers (e.g., TSC operators of FIG. 2B) in the first range (demographics) in the three ranges as shown in the following table:

TABLE 25

| A | B | Measure |
|---|---|---------|
| 1 | 1 | 1 |
| 1 | 1 | 1 |
| 1 | 1 | 4 |
| 1 | 1 | 21 |
| 1 | 2 | 1 |
| 1 | 2 | 9 |

S1 and S2 receive input rows from the one or more producers for the second range and the third range in the three mutually exclusive ranges, respectively, as shown in the following tables:

TABLE 26

| A | B | measure |
|---|---|---------|
| 1 | 2 | 10 |
| 1 | 2 | 20 |
| 2 | 1 | 7 |
| 2 | 1 | 10 |
| 2 | 2 | 1 |
| 2 | 2 | 5 |

TABLE 27

| A | B | measure |
|---|---|---------|
| 2 | 2 | 10 |
| 2 | 3 | 1 |
| 2 | 3 | 1 |
| 2 | 3 | 7 |

TABLE 27-continued

| A | B | measure |
|---|---|---------|
| 2 | 3 | 9 |
| 2 | 3 | 11 |
| 2 | 3 | |

The consumers (S0, S1 and S2) compute locally evaluated results of the cumulative window functions "FIRST_VALUE( )" and "LAST_VALUE( )" based on the consumers' respective input data and send the locally evaluated results (some of which may be partial) of the first and last rows in their respective input data to a query coordinator (e.g., 206 of FIG. 2B), as shown in the following table:

TABLE 28

| Consumers | Information to QC | |
|-----------|-------------------|---|
| S0 | The first row | (1, 1, 1, 21) |
|    | The last row  | (1, 2, 1, 9) |
| S1 | The first row | (1, 2, 10, 20) |
|    | The last row  | (2, 2, 7, 5) |
| S2 | The first row | (2, 2, 10, 10) |
|    | The last row  | (2, 3, 10, null) |

As can be seen above, for each (e.g., the last row of S0) of the first and last rows, a consumer (e.g., S0) sends a multi-field object (e.g., (1, 2, 1, 9))—which may comprise partial evaluation result—that comprises a partition-by key value (e.g., "1") of a data partition to which that row belongs, a further order-by key value (e.g., "2") of that row, a FIRST_VALUE( ) function value 1 up to that row, and a LAST_VALUE( ) function value 9 up to that row, as seen in the input data (e.g., TABLE 25) received by the consumer (S0).

Based on the data (e.g., TABLE 28) received from the consumers, the query coordinator returns consolidated results as shown in the following table:

TABLE 29

| Consumers | Information from QC |
|-----------|---------------------|
| S0 | for the first_value, no "offset" needed for the first data partition (A = "1" data partition); use the local first_value in the first data partition; for the last_value, the last data partition (A = "1" data partition) has tied rows from S1, use the last_value 20 of S1's first row for tied rows in the last data partition of S0 |
| S1 | for the first_value in the first data partition (A = "1" data partition), use the first_value 1 of S0's last row as "replacement" for tied rows (tied with S0's last row) in S1; for the last_value in the last data partition (A = "2" data partition), since S1's last data partition has tied rows from S2, use the last_value 10 from S2's first row for these "tied" rows in the last data partition of S1 |
| S2 | for the first_value, use the first_value 7 from S1's last row as "replacement" for the first and only data sub-partition (A = "2" data partition); for the last_value, use the local last_value without special processing |

Based on the information from the query coordinator, each consumer can complete full evaluation of the cumulative window functions FIRST_VALUE( ) and LAST_VALUE( ) for each of the input rows for which that consumer is responsible.

To evaluate a ranking or cumulative window function in a database statement as shown in expression (16), as in other ranking or cumulative window functions, the number of consumers may be determined based on a desired value of DOP. For the purpose of illustration, four consumers (e.g., window sort operators 204-1 through 204-4 illustrated in FIG. 2B), respectively denoted as S0, S1, S2, and S3, are to be used. An extended data distribution key that comprises a partition-by key "A" and an order-by key "B" but no temporary distribution variable is used for data distribution to the consumers. All possible distinct combinational values of the partition-by key "A" and the order-by key "B" are divided into four mutually exclusive ranges. Each of the four mutually exclusive ranges is assigned to a different consumer S0, S1, S2, or S3, respectively.

For example, S0 receives input rows from one or more producers (e.g., TSC operators of FIG. 2B) in the first range (demographics) in the three ranges as shown in the following table:

TABLE 30

| A | B | measure |
|---|---|---------|
| 1 | 1 | |
| 1 | 2 | |
| 1 | 3 | |
| 1 | 4 | |
| 1 | 5 | 10 |

S1, S2 and S3 receive input rows from one or more producers for the other ranges in the four mutually exclusive ranges, respectively, as shown in the following tables:

TABLE 31

| A | B | measure |
|---|---|---------|
| 1 | 6 | 1 |
| 1 | 6 | 9 |
| 1 | 7 | 20 |
| 2 | 8 | 7 |

TABLE 32

| A | B | measure |
|---|---|---------|
| 2 | 9 | 1 |
| 2 | 10 | 5 |
| 2 | 11 | 10 |
| 2 | 12 | |

TABLE 33

| A | B | measure |
|---|---|---------|
| 2 | 13 | |
| 2 | 14 | |
| 2 | 15 | 1 |
| 2 | 16 | |
| 2 | 17 | |

The consumers (S0, S1, S2 and S3) computes locally evaluated results of the cumulative window functions "FIRST_VALUE (<expr> IGNORE NULLS)" and "LAST_VALUE (<expr> IGNORE NULLS)" based on their respective input data and send the locally evaluated results (some of which may be partial) of the first and last rows in their respective input data to a query coordinator (e.g., 206 of FIG. 2B), as shown in the following table:

TABLE 34

| Consumers | Information to QC | |
|---|---|---|
| S0 | The first row | (1, null, null) |
|  | The last row | (1, 10, 10) |
| S1 | The first row | (1, 1, 9) |
|  | The last row | (2, 7, 7) |
| S2 | The first row | (2, 1, 1) |
|  | The last row | (2, 1, 10) |
| S3 | The first row | (2, null, null) |
|  | The last row | (2, 1, 1) |

As can be seen above, for each (e.g., the last row of S0) of the first and last rows, a consumer (e.g., S0) sends a multi-field object (e.g., (1, 10, 10))—which may comprise partial evaluation result—that comprises a key value (e.g., "1") of a data partition to which that row belongs, a first-value-ignore-nulls function value 10 of a data sub-partition (A "1" and B "5" data sub-partition) to which that row belongs, and a last-value-ignore-nulls function value (also) 10 of the data sub-partition (A "1" and B "5" data sub-partition) to which that row belongs, as seen in the input data (e.g., TABLE 30) received by the consumer (S0).

Based on the data (e.g., TABLE 34) received from the consumers, the query coordinator returns full evaluation results and other necessary information as shown in the following table:

TABLE 35

| Con-sumers | Information from QC |
|---|---|
| S0 | no special processing for either the first_value ignore nulls or the last_value ignore nulls (nulls in the local data are ignored in local processing of S0 until a first non-null—10 in this example—is encountered in S0; if there is no non-null in S1, continue until a non-null is encountered in subsequent consumer(s)) |
| S1 | for the first_value ignore nulls, use the first_value 10 from S0's last row as "replacement" for rows from the first data partition (A "1" data partition); for the last_value ignore nulls, no special processing |
| S2 | for the first_value ignore nulls, use the first_value 7 from S1's last row as "replacement" for rows from the data partition (A "2" data partition); for the last_value ignore nulls, no special processing |
| S3 | for the first_value ignore nulls, use the first_value 7 of S1's last row as "replacement" for rows in the first data partition (A "2" data partition) for the last_value ignore nulls, replace with the last_value 10 of S2's last row for rows with null local last_values |

Based on the information from the query coordinator, each consumer can complete full evaluation of the cumulative window functions FIRST_VALUE (IGNORE NULLS) and LAST_VALUE (IGNORE NULLS) for each of the input rows for which that consumer is responsible.

Alternatively, to evaluate a ranking or cumulative window function in a database statement as shown in expression (16), an extended data distribution key that comprises a "measure" column specified in expression (16) in addition to a partition-by key "A" and an order-by key "B" may be used for data distribution, without using a temporary distribution variable. All possible distinct combinational values of the partition-by key "region", the order-by key "sales_amount", and the "measure" column, are divided into four mutually exclusive ranges. Each of the four mutually exclusive ranges is assigned to a different consumer S0, S1, S2, or S3.

For example, S0 receives input rows from one or more producers (e.g., TSC operators of FIG. 2B) in the first range (demographics) in the four ranges as shown in the following table:

TABLE 36

| A | B | Measure |
|---|---|---|
| 1 | 1 |  |
| 1 | 1 |  |
| 1 | 1 |  |
| 1 | 1 |  |
| 1 | 2 | 1 |

S1, S2 and S3 receive input rows from one or more producers for the other three ranges in the four mutually exclusive ranges, respectively, as shown in the following tables:

TABLE 37

| A | B | Measure |
|---|---|---|
| 1 | 2 | 9 |
| 1 | 2 | 10 |
| 1 | 2 | 20 |
| 2 | 1 | 7 |

TABLE 38

| A | B | Measure |
|---|---|---|
| 2 | 2 | 1 |
| 2 | 2 | 5 |
| 2 | 2 | 10 |
| 2 | 3 | 1 |

TABLE 39

| A | B | Measure |
|---|---|---|
| 2 | 3 |  |
| 2 | 3 |  |
| 2 | 3 |  |
| 2 | 3 |  |
| 2 | 3 |  |

The consumers (S0, S1, S2 and S3) compute locally evaluated results of the cumulative window functions "FIRST_VALUE (IGNORE NULLS)" and "LAST_VALUE (IGNORE NULLS)" based on their respective input data and send the locally evaluated results (some of which may be partial) of the first and last rows in their respective input data to a query coordinator (e.g., 206 of FIG. 2B), as shown in the following table:

TABLE 40

| Consumers | Information to QC | |
|---|---|---|
| S0 | The first row | (1, 1, null, null) |
|  | The last row | (1, 2, 1, 1) |
| S1 | The first row | (1, 2, 9, 20) |
|  | The last row | (2, 1, 7, 7) |
| S2 | The first row | (2, 2, 1, 10) |
|  | The last row | (2, 3, 1, 1) |
| S3 | The first row | (2, 3, null, null) |
|  | The last row | (2, 3, null, null) |

As can be seen above, for each (e.g., the last row of S0) of the first and last rows, a consumer (e.g., S0) sends a multi-field object (e.g., (1, 2, 1, 1))—which may comprise partial evaluation result—that comprises a partition-by key value (e.g., "1") of a data partition to which that row belongs, a further order-by key value (e.g., "2") of that row, a FIRST_VALUE( ) function value 1 up to that row, and a LAST_VALUE( ) function value (also) 1 up to that row, as seen in the input data (e.g., TABLE 36) received by the consumer (S0).

Based on the data (e.g., TABLE 40) received from the consumers, the query coordinator returns consolidated results as shown in the following table:

TABLE 41

Consumers Information from QC

| | |
|---|---|
| S0 | for the first_value ignore nulls, no special processing; use the first non-null 1 encountered in the local data of S0; for the last_value ignore nulls, use the last_value 20 from S1's first row as the final result for the last data partition (A = "1" data partition), as S0's last row has tied rows from S1 |
| S1 | for the first_value ignore nulls in the first data partition (A = "1" data partition), use the first_value 1 from S0's last row as "replacement" for rows from the first data partition (A "1" data partition) of S1; for the last_value ignore nulls, no special processing |
| S2 | for the first_value ignore nulls in the first data partition (A = "2" data partition), use the first_value 7 from S1's last row as "replacement" for rows from the first data partition (A "2" data partition) of S2; for the last_value ignore nulls in the last data partition (also A = "2" data partition), S2's last row has tied rows from S3; however, since the tied rows from S3 have null values for the last_value, use S2's local last_value 1 for the rows in S2's last data partition |
| S3 | for the first_value ignore nulls, use the first_value 7 from S1's last row as "replacement" for rows from the first data partition (A "2" data partition) for the last_value ignore nulls in the first data partition (A "2" data partition), since S3's first row has tied rows from S2, and since the rows in S3 have null values for the local last_values, use the last_value 1 from S2's last row as the final result |

Based on the information from the query coordinator, each consumer can complete full evaluation of the cumulative window functions FIRST_VALUE (IGNORE NULLS) and LAST_VALUE (IGNORE NULLS) for each of the input rows for which that consumer is responsible.

It should be noted that in some embodiments, processes need to send order-by key values to a query coordinator when a temporary distribution variable is included in the distribution key, as the query coordinator needs to know the order-by key values in order to generate the consolidated information to be returned to the processes. For the purpose of illustration, an order-by key "quarter" and a temporary distribution variable are used in the distribution key, both S1 and S2 may have a "quarter" column value "Q1.". The value "Q1" needs to be sent to the query coordinator so that the query coordinator, based on the specific window function, generate the consolidated information.

Execution Plan Generation

Figure 1B:
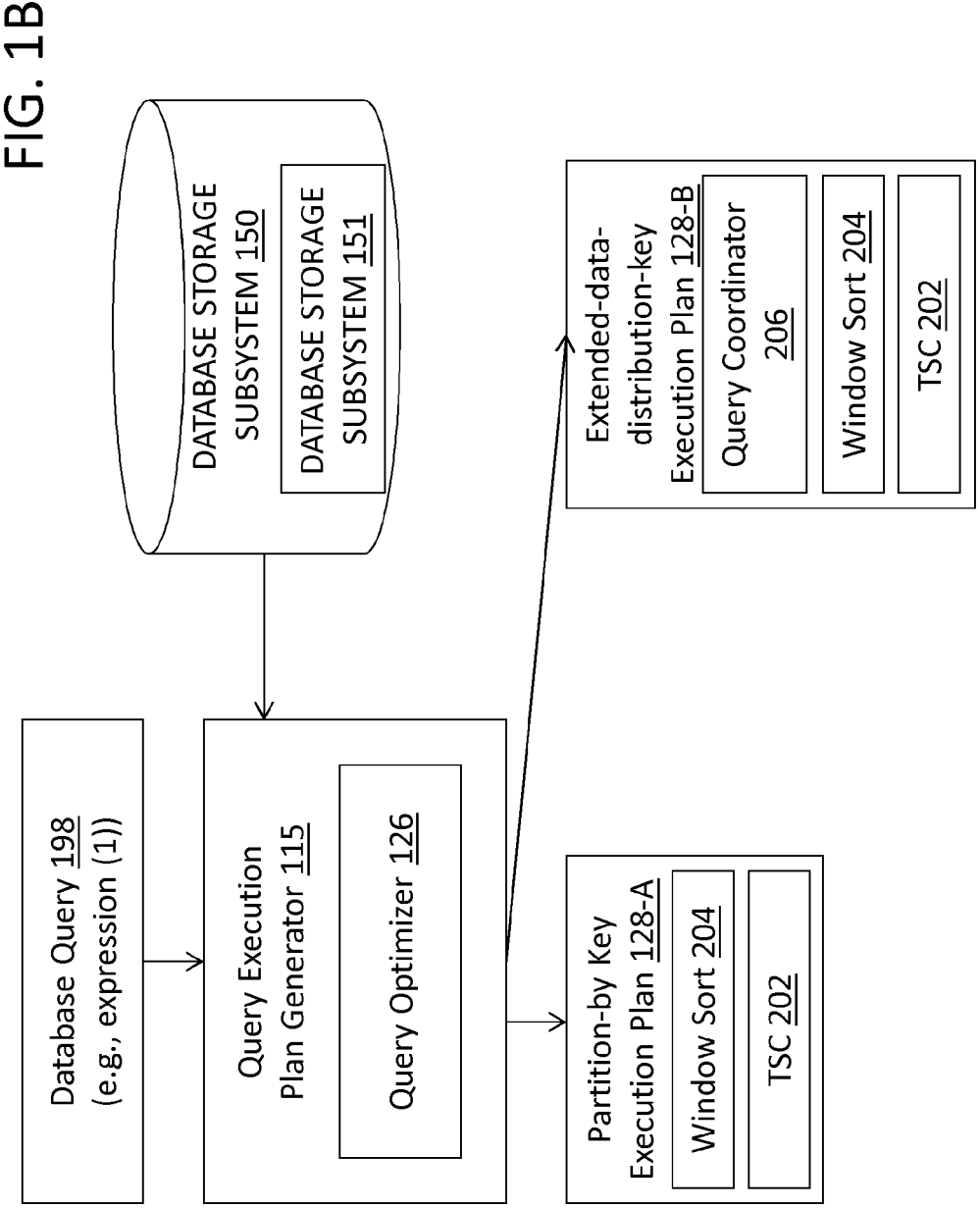
FIG. 1B is a block diagram that depicts the generation of exemplary query execution plans using a query optimizer.

FIG. 1B is a block diagram that depicts the generation of exemplary query execution plans using a query optimizer. FIG. 1B depicts a query execution plan generator 115, a query optimizer 126, a data-aware adaptive execution plan 128, a database storage subsystem 150, and a database statement 198 (e.g., expression (1)). Database storage subsystem 150 includes static query statistics 151. Partition-by-key execution plan 128A includes TSC operators 202 and window sort operators 204. Extended-data-distribution-key execution plan 128B includes TSC operators 202, window sort operators 204, and query coordinator 206. With respect to FIG. 1B, like numbered elements may correspond to the same elements from FIG. 1A.

In FIG. 1B, a database statement 198, which is a database statement (e.g., any of expressions (1)-(16)) comprising one or more of ranking window functions or cumulative window functions, is provided for processing by database system 100 of FIG. 1A. Database statement 198 is carried out on a "sales" table corresponding to TABLE 1. The "sales" table may be stored in database table 152 of FIG. 1A. Specifically, database statement 198 is structured as a SQL statement. In this manner, a user can retrieve individual input rows with results of analytical functions such as the one or more of ranking window functions or cumulative window functions specified in the database statement.

As shown in FIG. 1B, the database statement 198 is processed through query execution plan generator 115. An intermediate execution plan may result, which is further processed through query optimizer 126. Query optimizer 126 may modify the intermediate execution plan based on the estimated number of distinct (combinational) values of partition-by keys of partition-by keys. In response to determining that partition-by keys with a sufficient number of distinct values for data distribution in parallel execution exists, a partition-by-key execution plan such as 128A is provided, where full aggregation is only carried out at window sort operators 204. In response to determining that an extended data distribution key with a sufficient number of distinct values for data distribution in parallel execution exists, an extended-data-distribution-key execution plan such as 128B is provided, where partial aggregation is carried out at window sort operators 204 for at least one of the ranking or cumulative window functions and full aggregation is carried out at query coordinator 206 for the at least one of the ranking or cumulative window functions.

It may be noted that the methods and procedures discussed in the present application are generally applicable for producer operators of any execution plan, regardless of complexity or specific structure. Thus, record sources for window sort operators or window consolidation operators are not restricted to table scans and could be other operators such as table joins or even other window sort operators or window consolidation operators.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
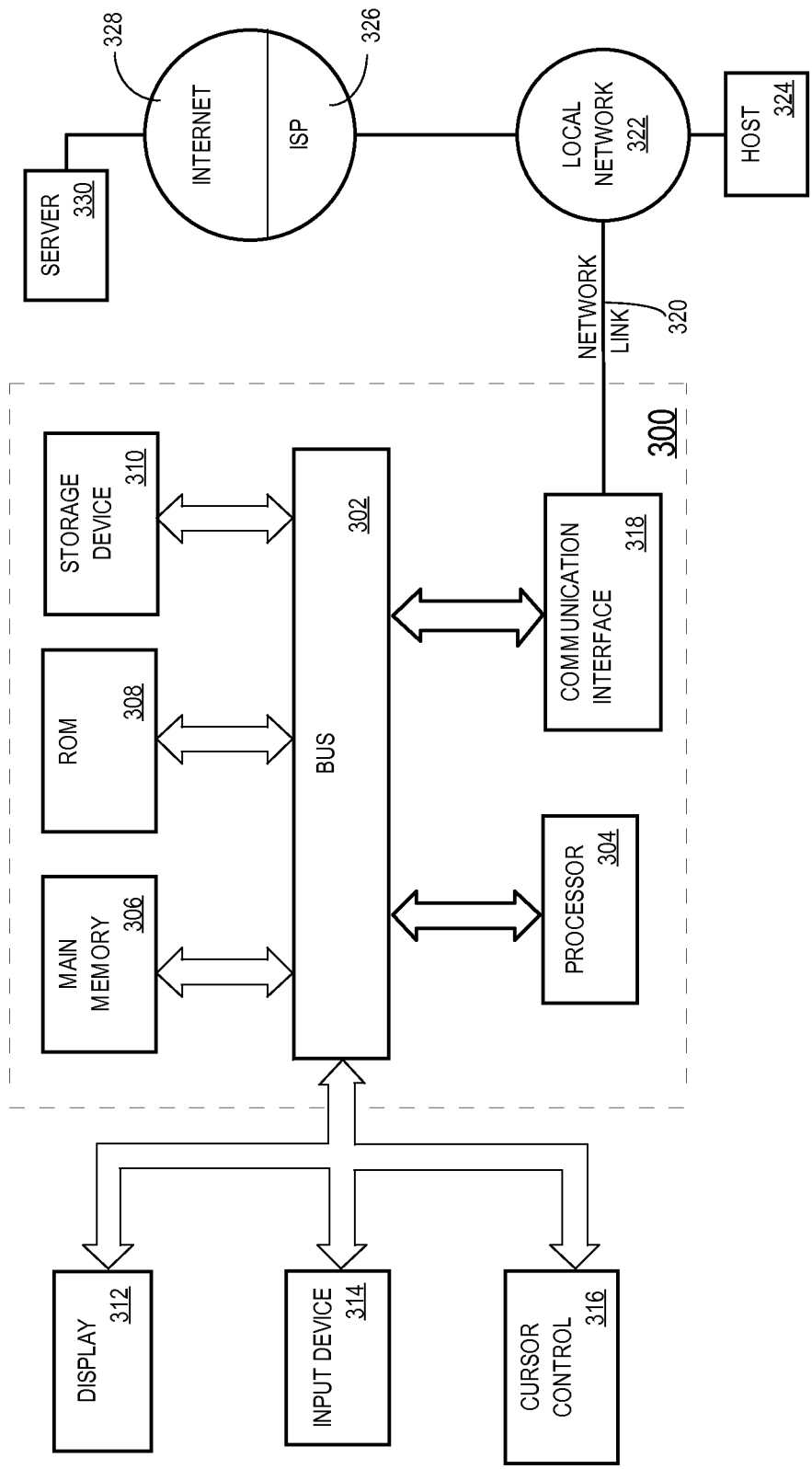
FIG. 3 is a block diagram illustrating a computer system on which embodiments of the invention may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
generating an execution plan for a database statement issued against a plurality of rows comprising a plurality of columns, where said database statement specifies a window function and specifies for said window function, a partition-by key of said plurality of columns and an order-by key of said plurality of columns;
determining a number of sort operators to be included in said execution plan;
determining a distribution key based at least in part on the partition-by key and the order-by key;
determining, based on the distribution key, a plurality of mutually exclusive ranges; and
determining, based at least in part on the plurality of mutually exclusive ranges, a distribution function for distributing each row of the plurality of rows to a respective specific sort operator of said sort operators based on values of the partition-by key and the order-by key of said each row;
wherein the method is performed by one or more computing devices.

2. The method of claim 1, further comprising executing said execution plan, wherein said executing comprises:
each sort operator of said sort operators locally evaluating the window function based on a respective subset of rows in the plurality of rows, wherein said respective subset of rows in the plurality of rows is distributed to said each sort operator based on the distribution function;
said sort operators sending locally evaluated results of the window function to a query coordinator;
said query coordinator consolidating said locally evaluated results of the window function and returning consolidated results of said window function to said sort operators; and
each sort operator of said sort operators, based at least in part on one or more of said consolidated results of said window function, generating globally complete results of said window function for each row in a respective subset of rows in the plurality of rows.

3. The method of claim 2, wherein each sort operator of said sort operators has a respective location in a global order implemented by said distribution function, and further including said each sort operator receiving a respective consolidated result of said consolidated results from said query coordinator based on said respective location of said each sort operator in said global order.

4. The method of claim 1, wherein a temporary distribution variable is further included in said distribution function.

5. The method of claim 1, wherein each sort operator of said sort operators is assigned one or more contiguous ranges in the plurality of mutually exclusive ranges.

6. The method of claim 1, wherein the distribution key further comprises one or more of partition-by keys other than the partition-by key, or order-by keys other than the order-by key.

7. The method of claim 1, wherein said window function is a ranking window function.

8. The method of claim 1, wherein said window function is a cumulative window function.

9. The method of claim 1, wherein said window function comprises a measure that is based on an order-by key specified in said window function.

10. The method of claim 1, wherein said window function comprises a measure that is not based on an order-by key specified in said window function.

11. One or more non-transitory computer-readable media storing sequences of instructions that, when executed by one or more processors, cause performance of a method comprising:
generating an execution plan for a database statement issued against a plurality of rows comprising a plurality of columns, where said database statement specifies a window function and specifies for said window function, a partition-by key of said plurality of columns and an order-by key of said plurality of columns;
determining a number of sort operators to be included in said execution plan;
determining a distribution key based at least in part on the partition-by key and the order-by key;
determining, based on the distribution key, a plurality of mutually exclusive ranges; and
determining, based at least in part on the plurality of mutually exclusive ranges, a distribution function for distributing each row of the plurality of rows to a respective specific sort operator of said sort operators based on values of the partition-by key and the order-by key of said each row.

12. The one or more non-transitory computer-readable media of claim 11, wherein the sequences of instructions further comprise instructions that, when executed by said one or more processors, cause executing said execution plan, wherein said executing comprises:
each sort operator of said sort operators locally evaluating the window function based on a respective subset of rows in the set of rows, wherein said respective subset of rows in the plurality of rows is distributed to said each sort operator based on the distribution function;
said sort operators sending locally evaluated results of the window function to a query coordinator;
said query coordinator consolidating said locally evaluated results of the window function and returning consolidated results of said window function to said sort operators; and
each sort operator of said sort operators, based at least in part on one or more of said consolidated results of said window function, generating globally complete results of said window function for each row in a respective subset of rows in the plurality of rows.

13. The one or more non-transitory computer-readable media of claim 12, wherein each sort operator of said sort operators has a respective location in a global order implemented by said distribution function, and wherein the sequences of instructions further include instructions that, when executed by said one or more processors, cause each sort operator of said sort operations receiving a respective consolidated result of said consolidated results from said query coordinator based on said relative location of said each sort operator in said global order.

14. The one or more non-transitory computer-readable media of claim 11, wherein a temporary distribution variable is further included in said distribution function.

15. The one or more non-transitory computer-readable media of claim 11, wherein the sequences of instructions further include instructions that, when executed by said one or more processors, cause sort operator of said sort operators being assigned one or more contiguous ranges in the plurality of mutually exclusive ranges.

16. The one or more non-transitory computer-readable media of claim 11, wherein the distribution key further comprises one or more of partition-by keys other than the partition-by key, or order-by keys other than the order-by key.

17. The one or more non-transitory computer-readable media of claim 11, wherein said window function is a ranking window function.

18. The one or more non-transitory computer-readable media of claim 11, wherein said window function is a cumulative window function.

19. The one or more non-transitory computer-readable media of claim 11, wherein said window function comprises a measure that is based on an order-by key specified in said window function.

20. The one or more non-transitory computer-readable media of claim 11, wherein said window function comprises a measure that is not based on an order-by key specified in said window function.

* * * * *